(12) United States Patent
Koyano

(10) Patent No.: US 8,332,749 B2
(45) Date of Patent: Dec. 11, 2012

(54) ADJUSTING TABLES IN A DOCUMENT TO AVOID OVERLAP WITH LAST PAGE GRAPHICS

(75) Inventor: Hiroki Koyano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 749 days.

(21) Appl. No.: 12/237,299

(22) Filed: Sep. 24, 2008

(65) Prior Publication Data
US 2009/0013243 A1 Jan. 8, 2009

Related U.S. Application Data

(62) Division of application No. 10/865,867, filed on Jun. 14, 2004, now abandoned.

(30) Foreign Application Priority Data

Jul. 9, 2003 (JP) .................................. 2003-272362

(51) Int. Cl.
*G06N 3/00* (2006.01)
(52) U.S. Cl. ......... 715/247; 715/243; 715/251; 715/227
(58) Field of Classification Search .................. 715/247, 715/252, 223, 243
See application file for complete search history.

(56) References Cited

U.S. PATENT DOCUMENTS

| | | | |
|---|---|---|---|
| 4,761,737 A | 8/1988 | Duvall et al. | |
| 5,408,652 A | 4/1995 | Hayashi et al. | |
| 5,553,303 A | 9/1996 | Hayashi et al. | |
| 5,878,198 A | 3/1999 | Yuasa et al. | |
| 5,918,224 A | 6/1999 | Bredenberg | |
| 6,003,117 A | 12/1999 | Buer et al. | |
| 6,061,773 A | 5/2000 | Harvey et al. | |
| 6,353,821 B1 | 3/2002 | Gray | |
| 7,188,309 B2 * | 3/2007 | Simmons et al. | 715/244 |
| 7,409,632 B1 * | 8/2008 | DiRienzo | 715/226 |
| 2005/0010858 A1 * | 1/2005 | Koyano | 715/500 |
| 2007/0201053 A1 * | 8/2007 | Sellers et al. | 358/1.2 |

FOREIGN PATENT DOCUMENTS

| | | | |
|---|---|---|---|
| JP | 2000-222403 | | 8/2000 |
| JP | 2000222403 A | * | 8/2000 |

OTHER PUBLICATIONS

Bill Camarda, "Special Edition Using Microsoft Word 2000," 42 pages cited (Que 1999).*
Patrick Blattner, et al., "Special Edition Using Microsoft Excel 2000," 13 pages cited (Que 1999).*
Microsoft Office Word, Microsoft Office Online, Measure up with the horizontal ruler: Set margins, indents, and tabs, available at http://office.microsoft.com/en-us/word/HA011226861033.aspx?pid=CL100729361033&mode=print.

* cited by examiner

*Primary Examiner* — Doug Hutton
*Assistant Examiner* — Scott M Kelly
(74) *Attorney, Agent, or Firm* — Fitzpatrick, Cella, Harper & Scinto

(57) ABSTRACT

A method and apparatus for creating a document is provided. The lower limit position on the last page of a table graphic pattern which constitutes a document is designated. The position and shape of the table graphic pattern are set. Data is input into the table graphic pattern. A table graphic pattern component on the last page of the table graphic pattern is deformed such that the table graphic pattern component on the last page is not located at a position lower than the lower limit position when inputting data into the table graphic pattern component on the last page.

9 Claims, 11 Drawing Sheets

FIG. 9

| PRODUCT NAME | AMOUNT |
|---|---|
| TOTAL | ¥6,200 |

| PRODUCT NAME | AMOUNT |
|---|---|
| PRODUCT M | ¥400 |
| PRODUCT N | ¥400 |
| PRODUCT O | ¥400 |
| PRODUCT P | ¥400 |
| PRODUCT Q | ¥400 |
| PRODUCT R | ¥400 |
| PRODUCT S | ¥500 |

PLEASE CONTACT ○○ FOR FURTHER DETAILS.
DIVISION: ××SALES DEPARTMENT, ○○○ SECTION
TELEPHONE: △△△-△△△△

801

-2-

INVOICE
××(MONTH) ○○(DAY), 20△△(YEAR)
TO K.K. ○○○○ BUSINESS COMPANY

| PRODUCT NAME | AMOUNT |
|---|---|
| PRODUCT G | ¥200 |
| PRODUCT H | ¥200 |
| PRODUCT I | ¥200 |
| PRODUCT J | ¥200 |
| PRODUCT K | ¥200 |
| PRODUCT L | ¥200 |

| PRODUCT NAME | AMOUNT |
|---|---|
| PRODUCT A | ¥100 |
| PRODUCT B | ¥100 |
| PRODUCT C | ¥100 |
| PRODUCT D | ¥100 |
| PRODUCT E | ¥100 |
| PRODUCT F | ¥100 |

| PRODUCT NAME | AMOUNT |
|---|---|
| PRODUCT M | ¥400 |
| PRODUCT N | ¥400 |
| PRODUCT O | ¥400 |
| PRODUCT P | ¥400 |
| PRODUCT Q | ¥400 |
| PRODUCT R | ¥400 |

| PRODUCT NAME | AMOUNT |
|---|---|
| PRODUCT S | ¥500 |
| PRODUCT T | ¥500 |
| PRODUCT U | ¥500 |
| PRODUCT V | ¥500 |
| TOTAL | ¥6,200 |

PLEASE CONTACT ○○ FOR FURTHER DETAILS.
DIVISION : ××SALES DEPARTMENT, ○○○ SECTION
TELEPHONE : △△△-△△△△

-2-

901

INVOICE
××(MONTH) ○○(DAY), 20△△(YEAR)
TO K.K. ○○○○ BUSINESS COMPANY

| PRODUCT NAME | AMOUNT |
|---|---|
| PRODUCT A | ¥100 |
| PRODUCT B | ¥100 |
| PRODUCT C | ¥100 |
| PRODUCT D | ¥100 |
| PRODUCT E | ¥100 |
| PRODUCT F | ¥100 |

| PRODUCT NAME | AMOUNT |
|---|---|
| PRODUCT G | ¥200 |
| PRODUCT H | ¥200 |
| PRODUCT I | ¥200 |
| PRODUCT J | ¥200 |
| PRODUCT K | ¥200 |
| PRODUCT L | ¥200 |

-1-

ADJUSTING TABLES IN A DOCUMENT TO AVOID OVERLAP WITH LAST PAGE GRAPHICS

This application is a division of application Ser. No. 10/865,867, filed Jun. 14, 2004 (pending), the contents of which are incorporated by reference herein.

FIELD OF THE INVENTION

The present invention relates to a method and apparatus for creating a document.

BACKGROUND OF THE INVENTION

A document creation/editing program in a computer system or the like often has a function of flowing a plurality of record data into a graphic pattern mainly comprised of ruled lines (to be referred to as a table graphic pattern hereinafter) and arranging the record data in a table form to create a document when, for example, a business operation document is to be created.

For example, when a table graphic pattern having a plurality of columns on a single page or a table graphic pattern across a plurality of pages is to be created, the technique disclosed in Japanese Patent Laid-Open No. 2000-222403 can set an upper start limit position for table graphic pattern components from the second column (table graphic pattern components from the second page). The lower end positions of the table graphic pattern components from the second column (table graphic pattern components from the second page) are aligned with the lower reference end position of the table graphic pattern in the first column (table graphic pattern component on the first page).

In creating a document having a table graphic pattern across a plurality of pages, the user may want to insert a fixed graphic pattern or characters below the table graphic pattern component on the last page. However, when a table graphic pattern is to be created across a plurality of pages by using the above-mentioned technique disclosed in Japanese Patent Laid-Open No. 2000-222403, a common lower reference end position is set for all pages. For this reason, in some cases, part of the table graphic pattern and the permanent graphic pattern or characters may overlap with each other.

Generally, in many cases, a document creation program performs at separate timings a process of creating/editing a table graphic pattern and a process in which the table graphic pattern receives record data and displays/prints the result. More specifically, the user creates a table graphic pattern after estimating the amount of record data which the table graphic pattern would receive. If the document creation program is operated in an environment in which a designated record data amount frequently changes, a table graphic pattern may be located at an unexpected position. For example, if the user wants to insert a fixed graphic pattern or characters below a table graphic pattern component on the last page, as described above, a fixed graphic pattern 801 created below the table graphic pattern component may overlap with part of the table graphic pattern component, as shown in FIG. 9, depending on the received record data amount.

SUMMARY OF THE INVENTION

The above-mentioned and other problems are solved by a method and apparatus for creating a document according to the present invention. The lower limit position on the last page of a table graphic pattern constituting a document is designated. The position and shape of the table graphic pattern are set. Data are input into the table graphic pattern. When data are to be input into the table graphic pattern component on the last page, the table graphic pattern component on the last page is deformed such that the table graphic pattern component on the last page does not extend below the lower limit position.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principles of the invention.

FIG. 9 is a view showing a case wherein a conventional document creation process causes a table graphic pattern component and a graphic pattern below the table graphic pattern component to overlap with each other; and FIG. 10 is a view showing an example wherein the table graphic patterns on the last page are deformed on the basis of the graphic pattern creation lower limit position.

DETAILED DESCRIPTION OF THE PREFERRED EMBODIMENTS

Preferred embodiments of the present invention will now be described in detail in accordance with the accompanying drawings.

Figure 1:
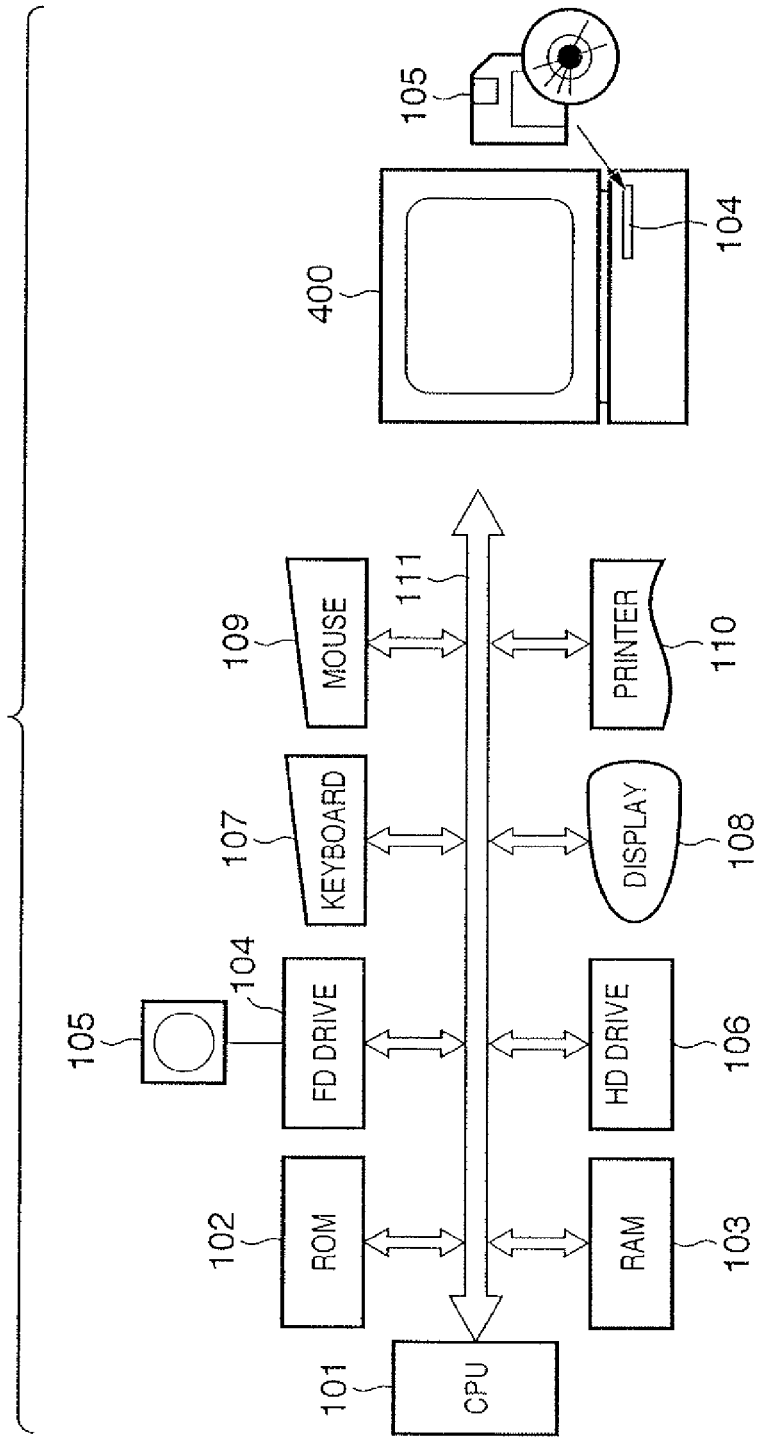
FIG. 1 is a block diagram of a hardware configuration of a document creation apparatus according to one embodiment of the present invention.

FIG. 1 is a block diagram showing the hardware configuration of a document creation apparatus according to one embodiment of the present invention. This apparatus comprises a CPU 101, an ROM 102, an RAM 103 serving as a main storage, an FD drive 104, an HD drive 106, a keyboard 107 and a mouse 109 serving as input devices, a display 108 serving as a display device, a printer or plotter 110 serving as an output device, a system bus 111 which connects them, and the like. The apparatus can be implemented by a general information processor such as a personal computer, work station, or the like. The computer system can be connected to a plurality of computer systems having similar hardware configurations through a network.

The CPU 101 executes a basic I/O program, OS, and control program (document creation program), thereby operating the document creation apparatus. The basic I/O program is written on the ROM 102, the OS is written in the HD drive 106, and the control program and related data are stored in an FD 105. When the document creation apparatus is powered on, an initial program loading (IPL) function in the basic I/0 program loads the OS from the HD drive 106 into the RAM 103. The OS starts operation and reads and executes the control program. The control program and related data may be stored in the HD drive 106, ROM 102, or the like.

Figure 2:
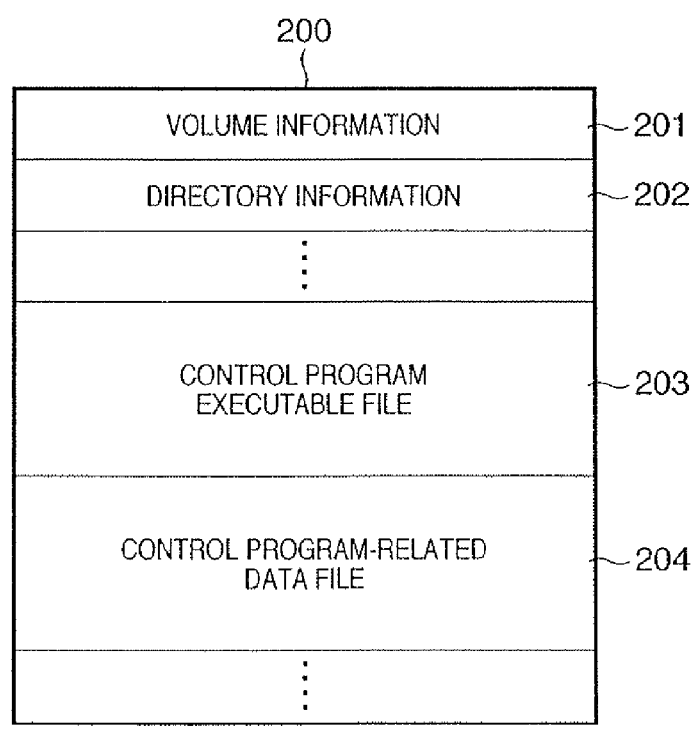
FIG. 2 is a memory map chart showing a document creation program stored in an FD according to the embodiment of the present invention.

Volume information 201, directory information 202, control program 203 and related data 204 are stored in the FD 105 in a manner as shown in memory map 200 in FIG. 2. When the FD 105 is inserted into the FD drive 104, as shown in FIG. 1, the control program and related data are read out from the FD 105 and loaded into the RAM 103 under the control of the OS and basic I/O program. In this manner, the control program and related data become operable.

Figure 3:
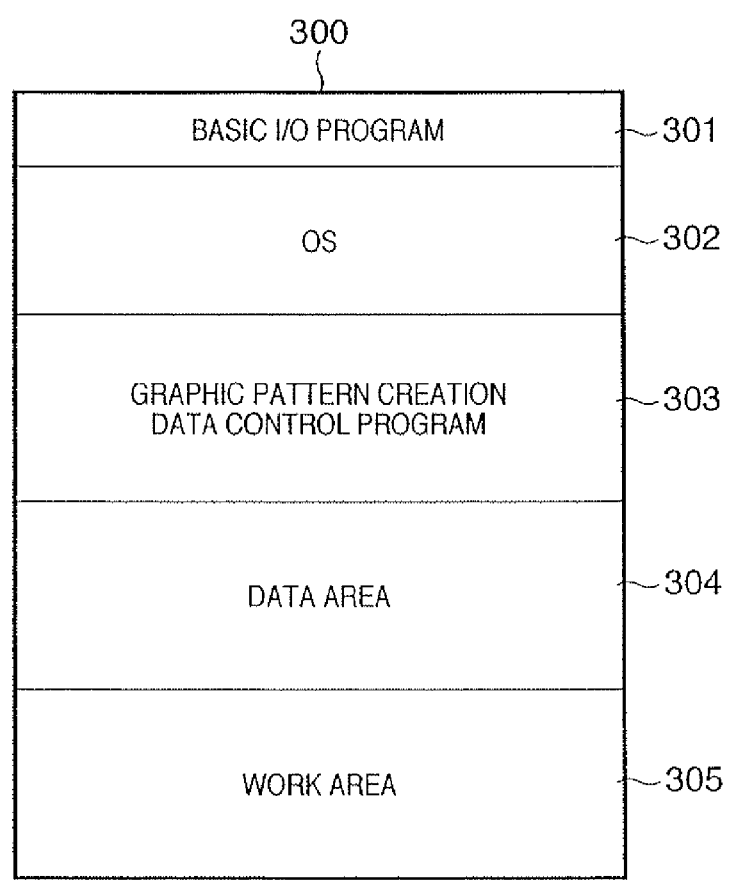
FIG. 3 is a memory map chart showing the document creation program as loaded into a main storage according to the embodiment of the present invention.
Figure 4A:
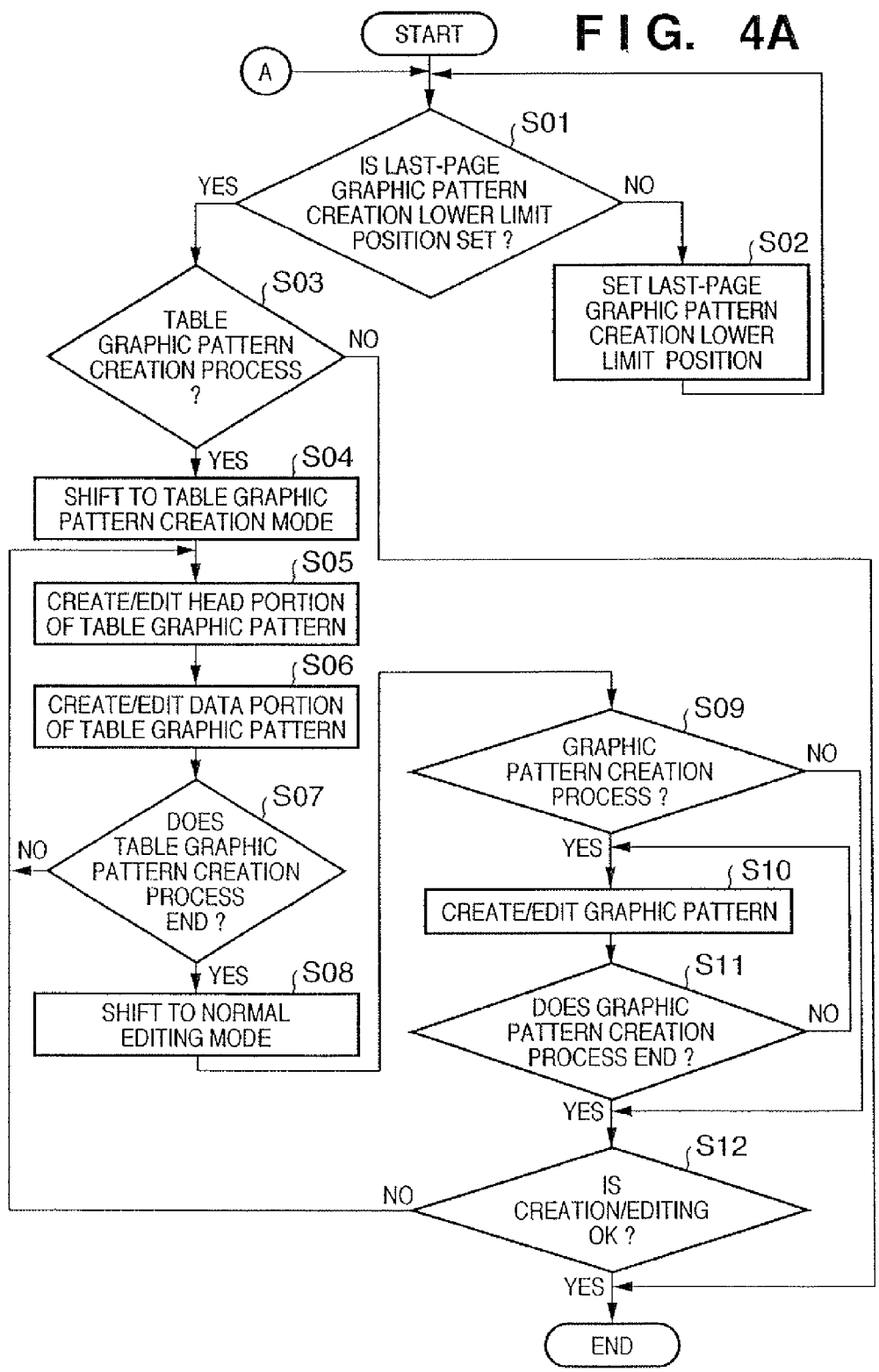
FIG. 4A is a flowchart depicting a document creation process according to the embodiment of the present invention.
Figure 4B:
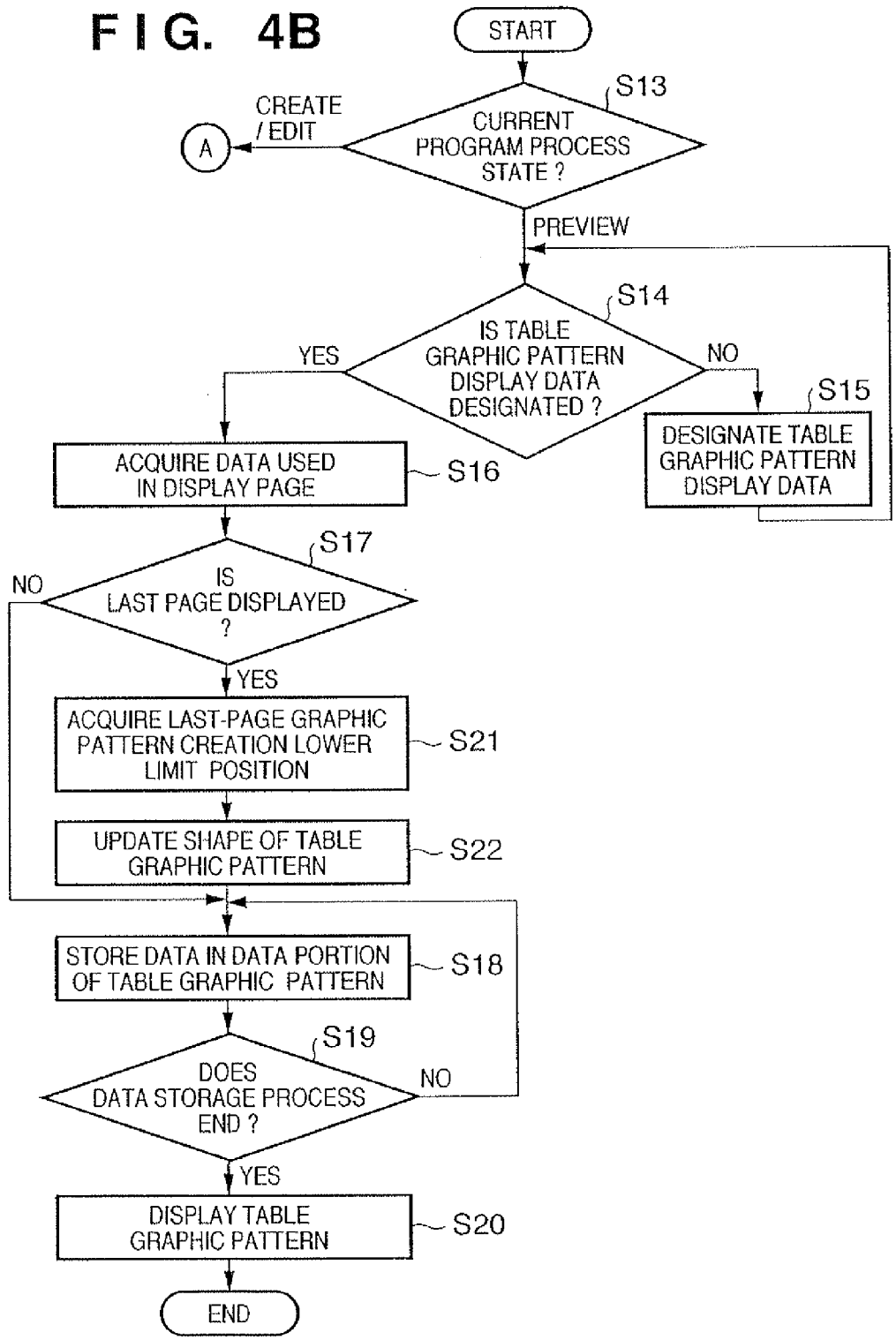
FIG. 4B is a flowchart depicting a process of previewing the result of flowing sample record data into a table graphic pattern according to the embodiment of the present invention.

FIG. 3 shows a memory map 300 when the control program is loaded into the RAM 103 and becomes executable, including basic I/O program 301, OS 302, graphic pattern creation data control program 303, data area 304, and work area 305. This embodiment illustrates a case wherein the control program and related data are directly loaded from the FD 105 into the RAM 103 and are executed. However, as shown in FIGS. 4A and 4B, the control program and related data may temporarily be loaded from the FD 105 into the HD drive 106, and may be loaded from the HD drive 106 into the RAM 103 upon execution of the program. As a medium for recording the control program, a CD ROM, IC memory card, or the like may be employed in addition to the FD. The program can be recorded on the ROM 102 and can be configured as part of the memory map so as to be directly executed by the CPU 101.

FIG. 4A is a flowchart showing a document creation process according to the embodiment of the present invention.

First, it is determined whether a last-page graphic pattern creation lower limit position for a table graphic pattern is set (step S01).

If it is determined in step S01 that the last-page graphic pattern creation lower limit position for the table graphic pattern is not set, in step S02, the last-page graphic pattern creation lower limit position for the table graphic pattern is set. Attributes to be set at this time are related to table graphic patterns and particularly include setting of the enabled/disabled state of the last-page graphic pattern creation lower limit position for the table graphic pattern and setting of the graphic pattern creation lower limit position if it is enabled.

Figure 5:
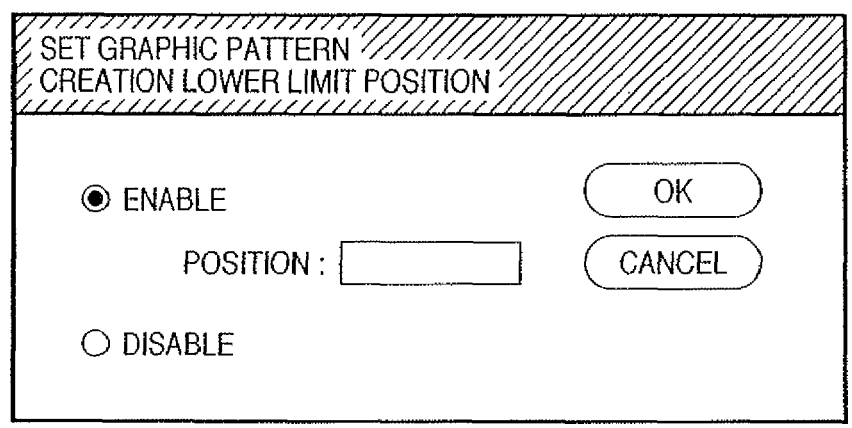
FIG. 5 is a view showing an example of a screen for setting the graphic pattern creation lower limit position on the last page.
Figure 6:
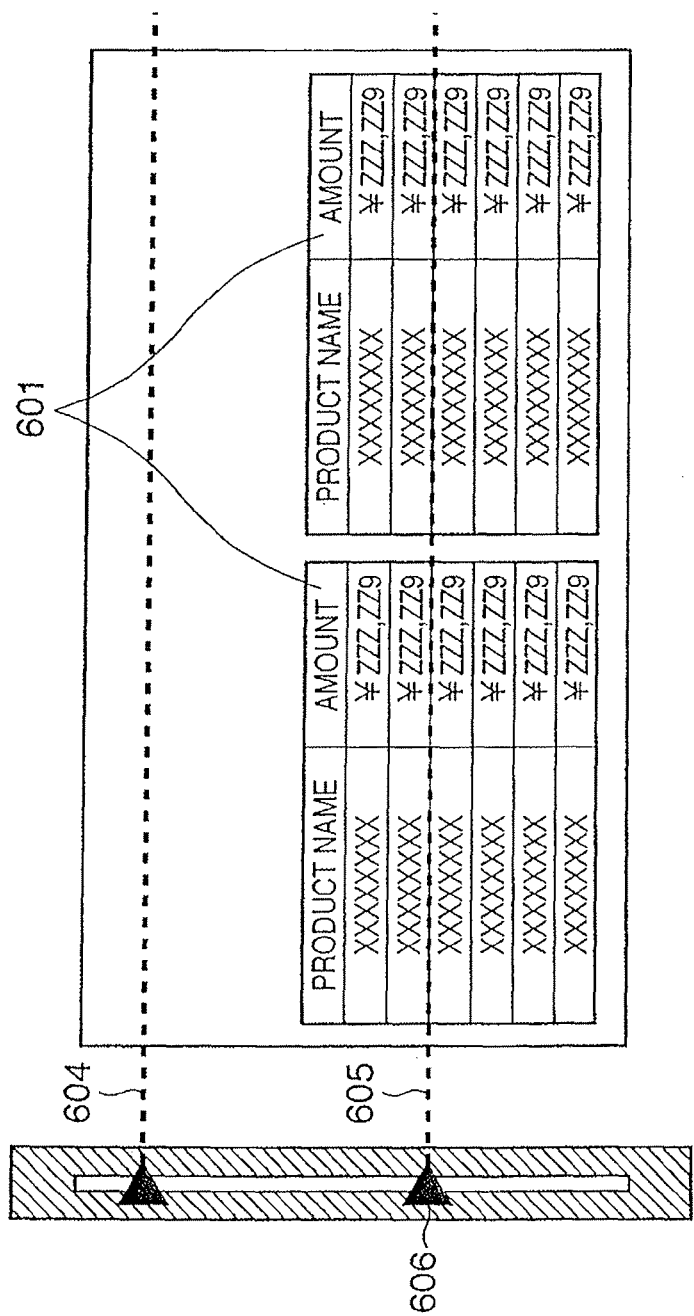
FIG. 6 is a view showing an example of a screen in a table graphic pattern creation/editing mode.

FIG. 5 shows an example of a screen for setting the last-page graphic pattern creation lower limit position for the table graphic pattern. A method of setting the graphic pattern creation lower limit position is not limited to designation by a numerical value derived from a dialog as shown in FIG. 5 or the like. As shown in FIG. 6, the graphic pattern creation lower limit position on a document design screen can be adjusted by dragging a slider 606 using the mouse 109. These settings are stored in the RAM 103 as the current attributes.

On the other hand, if it is determined in step S01 that the last-page graphic pattern creation lower limit position for the table graphic pattern is set, in step S03, it is determined whether to create a table graphic pattern.

Figure 8:
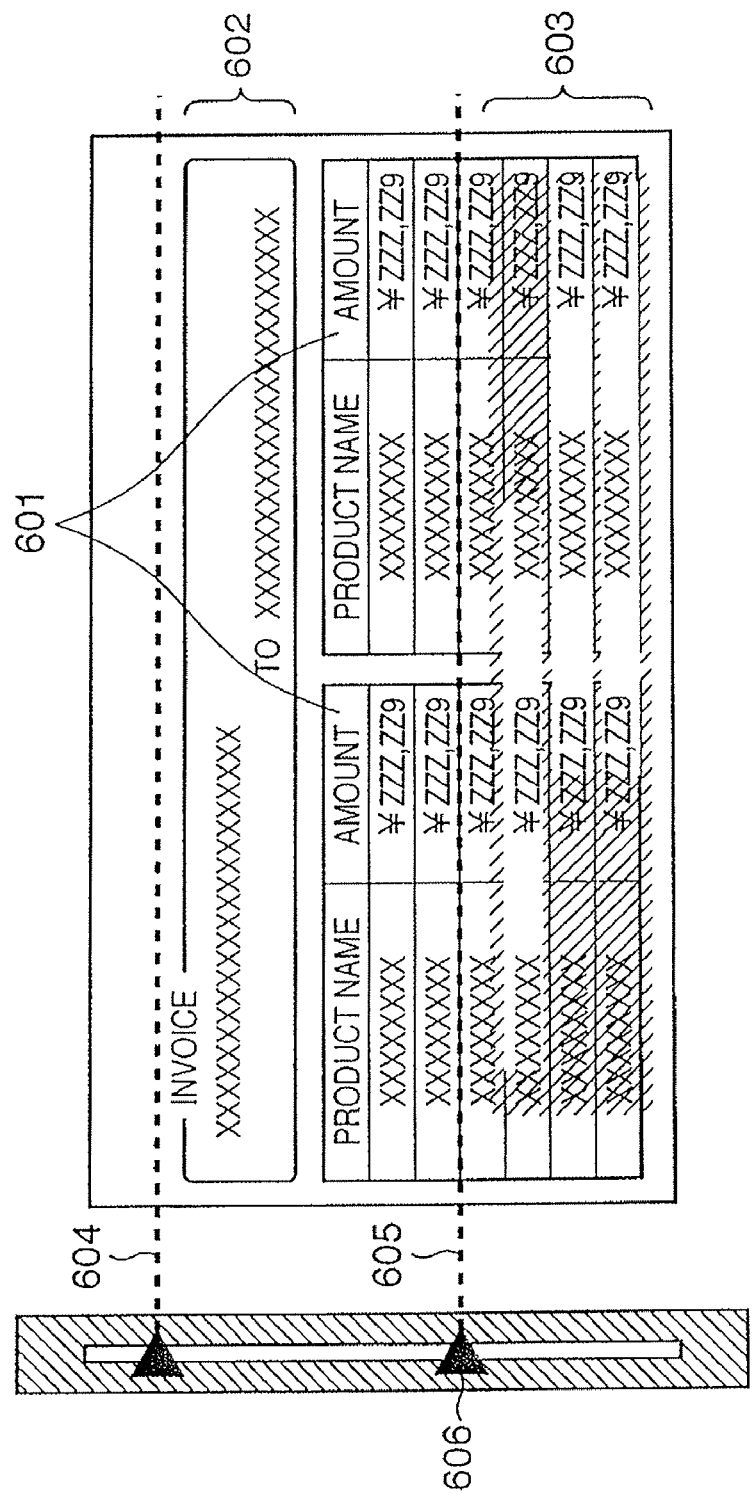
FIG. 8 is a view showing an example of a screen in creating/editing a table graphic pattern again.

If it is determined in step S03 not to create a table graphic pattern, the document creation process ends. On the other hand, if it is determined in step S03 to create (place/set) a table graphic pattern, the flow enters a mode of creating/editing a table graphic pattern (S04). Then, a process of setting the position and shape of a portion for displaying the names of the data items constituting the table graphic pattern (the header portion of a table graphic pattern) (S05) and a process of setting the position and shape of a portion for displaying the data (the data portion of the table graphic pattern) (S06) are performed. For example, a table graphic pattern 601 is created and set, as shown in FIG. 8. Reference numeral 601 denotes the table graphic pattern; 602, a fixed graphic pattern placed above the table graphic pattern 601; 603, a graphic pattern placed below the table graphic pattern; 604, a line indicating a table graphic pattern creation upper limit position; 605, a table graphic pattern creation lower limit position; and 606, the slider for changing the table graphic pattern creation lower limit position.

Processes in steps S05 and S06 are repeated until it is determined that the table graphic pattern creation/editing process ends (S07).

If it is determined in step S07 that the table graphic pattern creation/editing process ends, the flow exits the mode of creating/editing a table graphic pattern and shifts to a normal editing mode (S08).

It is determined next whether to perform a process of creating a graphic pattern other than a table graphic pattern (S09).

If it is determined in step S09 not to perform the process of creating a graphic pattern other than a table graphic pattern, the table graphic patterns created in steps S05 to S07 are displayed on the display 108, and the document creation process ends (S12).

Figure 7:
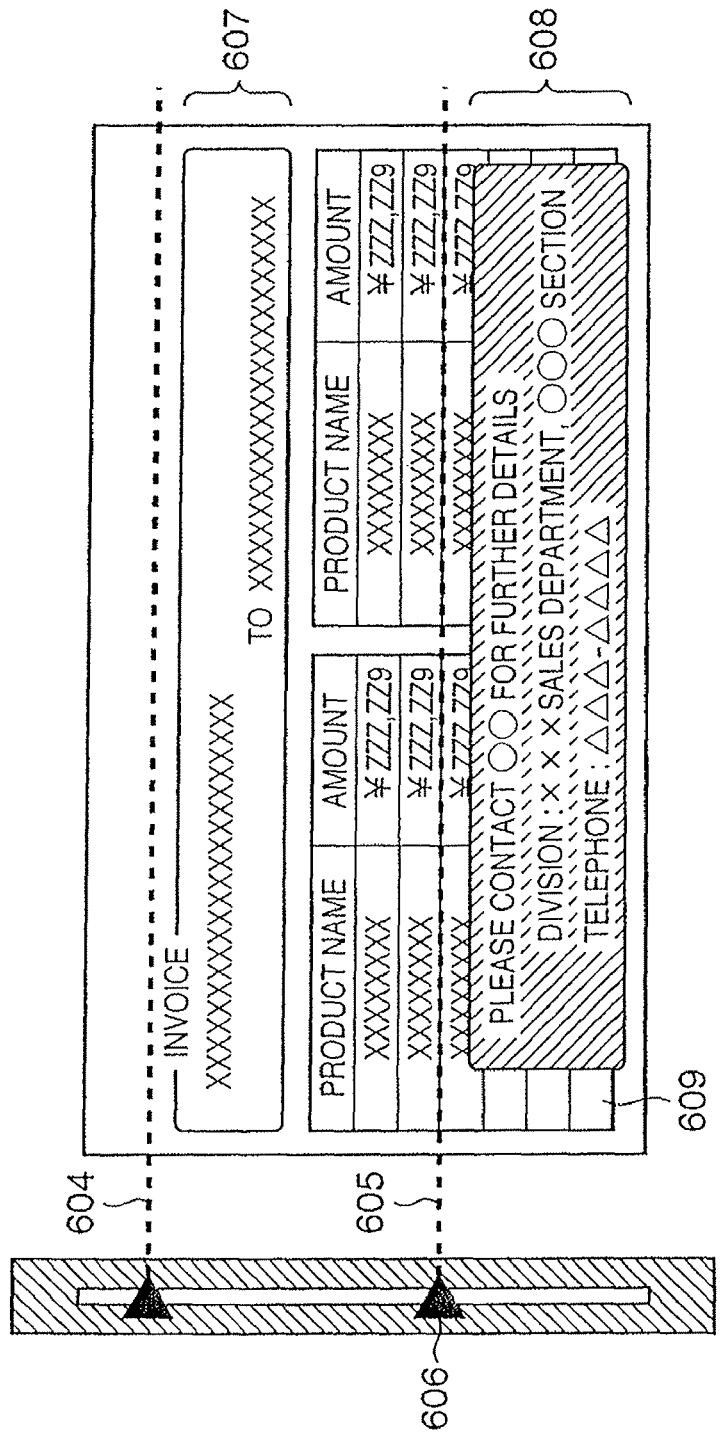
FIG. 7 is a view showing an example of a screen in a normal editing mode.

On the other hand, if it is determined in step S09 to perform the process of creating a graphic pattern other than a table graphic pattern, the graphic pattern creation process is performed (S10). For example, graphic patterns 607 and 608 are created in the normal editing mode, as shown in FIG. 7. Note that in this normal editing mode, a table graphic pattern created in the table graphic pattern creation/editing mode is displayed in a color which indicates a non-editable state (e.g., grey). The process in step S10 is repeated until it is determined that the graphic pattern creation process ends (S11).

If the user indicates that further table graphic pattern creation/editing is necessary in step S12, the flow returns to step S05, and table graphic pattern creation/editing operation is enabled. When the flow returns to step S05, the graphic patterns 602 and 603 created/edited in the normal editing mode are displayed in the color indicating the non-editable state (e.g., grey), as shown in FIG. 8. On the other hand, if it is determined in step S12 that further creation/editing is unnecessary, the created table graphic pattern and graphic patterns other than the table graphic pattern are displayed, and the document creation process ends.

In this embodiment, sample record data can be flowed into a table graphic pattern, and the result can be previewed on the display 108. FIG. 4B is a flowchart showing a process of implementing this.

First, in step S13, the current process state of the document creation program is determined.

If it is determined in step S13 that the document creation program is in the mode of creating/editing a document, the processes in steps S01 to S12 are continued.

On the other hand, if it is determined in step S13 that the document creation program is in the mode of giving a preview, it is determined whether data to be allocated to a table graphic pattern in a document is designated (S14).

If it is determined in step S14 that data to be allocated to the table graphic pattern in the document is not designated, data to be allocated to the table graphic pattern in the document is designated (S15).

A process of inputting/storing the data designated in step S15 in corresponding portions of the table graphic pattern is then performed.

First, data to be stored in a table graphic pattern component displayed on the current page is acquired (S16). It is determined whether the current page is the "last page" (S17).

If it is determined in step S17 that the current page is not the "last page", data is stored in corresponding portions of the table graphic pattern component on the basis of the shape of the table graphic pattern component created in steps S05 to S07 (S18). The process in step S18 is repeated until the process of storing data in a table graphic pattern ends (S19).

Finally, the table graphic pattern component storing data is displayed on the display 108 (S20).

If it is determined in step S17 that the current page is the "last page", the last-page graphic pattern creation lower limit position set in step S02 is acquired (S21), and the shape of a table graphic pattern component on the last page is deformed so as to fall within the graphic pattern creation lower limit position on the basis of the information acquired in step S21 and data acquired in step S16 (S22). After that, the processes in step S18 to S20 are preformed. For example, if the last-page graphic pattern creation lower limit position is not set, a table graphic pattern and a normal graphic pattern may overlap with each other, as shown in FIG. 9. On the other hand, in this embodiment, the graphic pattern creation lower limit position is set. Accordingly, in step S22, the shape of a table graphic pattern is deformed such that data components from "product S" (data components input below the graphic pattern creation lower limit position) are input into a right one of two columns, as shown in FIG. 10. Note that if the previewed result is unsatisfactory, the flow returns to the processes in step S04 to S12 to perform editing again.

FIG. 10 shows an example of a display format of a table graphic pattern component in which the setting of the last-page graphic pattern creation lower limit position is used.

When inputting actual record data into a document thus created and outputting the document, the processes in steps S14 to S20 are performed using the actual record data in the same manner as in the preview process.

As has been described above, according to this embodiment, a table graphic pattern creation lower limit position is set for the last page. With this arrangement, even if the amount of record data to be input into a table graphic pattern component changes, the table graphic pattern component and a fixed graphic pattern created below the table graphic pattern component on the last page can be displayed and printed without any overlap. For this reason, a document can be designed without paying much attention to variations in record data amount in document creation, and the need for performing reediting or the like for the displayed/printed table graphic pattern component is reduced. Accordingly, the document creation efficiency drastically increases.

OTHER EMBODIMENT

The above-mentioned embodiment sets a last-page table graphic pattern creation lower limit position for a table graphic pattern in which data is sequentially input in the longitudinal direction of a sheet. In the case of a table graphic pattern in which data is sequentially input in the lateral direction, a graphic pattern creation right (or left) limit position of the table graphic pattern is set. This makes it possible to cope with a case wherein a fixed graphic pattern needs to be inserted on the right side (or left side) of the last page.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for creating a document including a table graphic pattern, comprising:

setting means for setting a position and shape of the table graphic pattern in accordance with a first user operation;

generation means for generating a second graphic pattern other than the table graphic pattern in accordance with a second user operation, wherein the second graphic pattern is located at a predetermined position on the last page of the document;

locating means for locating the table graphic pattern on each page of the document in accordance with the position and shape set by said setting means, for entering any available record data in each data field of the table graphic pattern, and for storing the document in a memory; and preview display means for displaying a preview of the document, wherein said preview display means further displays, when displaying the last page of the document, the second graphic pattern generated by said generation means at the predetermined position and a line indicating a lower limit position of the table graphic pattern on the last page, wherein the line is movable up or down in accordance with a third user operation, and wherein the available record data is entered in the table graphic pattern after the lower limit position of the table graphic pattern is set, and if it is determined after filling in the available record data that the filled table graphic pattern and the second graphic pattern overlap one another on the last page in the preview, the filled table graphic pattern is deformed so as to fit within an area above the line.

2. The apparatus according to claim 1, wherein said preview display means displays the second graphic pattern in a predetermined color which indicates a non editable state.

3. The apparatus according to claim 1, further comprising sample data entering means for entering sample data in each data field of the table graphic pattern, wherein if the record data is not available, said preview display means displays a preview of the document including the table graphic pattern in which the sample data is entered.

4. A method for creating a document including a table graphic pattern, comprising:

a setting step of setting a position and shape of the table graphic pattern in accordance with a first user operation;

a generation step of generating a second graphic pattern other than the table graphic pattern in accordance with a second user operation, wherein the second graphic pattern is located at a predetermined position on the last page of the document;

a locating step of locating the table graphic pattern on each page of the document in accordance with the position and shape set in said setting step, of entering any available record data in each data field of the table graphic pattern, and of storing the document in a memory; and a preview display step of displaying a preview of the document, wherein said preview display step further displays, when displaying the last page of the document, the second graphic pattern generated in said generation step at the predetermined position and a line indicating a lower limit position of the table graphic pattern on the last page, wherein the line is movable up or down in accordance with a third user operation, and wherein the available record data is entered in the table graphic pattern after the lower limit position of the table graphic pattern is set, and if it is determined after filling in the available record data that the filled table graphic pattern and the second graphic pattern overlap one another on the last page in the preview, the filled table graphic pattern is deformed so as to fit within an area above the line.

5. The method according to claim 4, wherein said preview display step displays the second graphic pattern in a predetermined color which indicates a non editable state.

6. The method according to claim 4, further comprising a sample data entering step of entering sample data in each data field of the table graphic pattern, wherein if the record data is not available, said preview display step displays a preview of the document including the table graphic pattern in which the sample data is entered.

7. A non-transitory computer-readable storage medium storing a computer-executable program for creating a document including a table graphic pattern, said program comprising:
   a setting step of setting a position and shape of the table graphic pattern in accordance with a first user operation;
   a generation step of generating a second graphic pattern other than the table graphic pattern in accordance with a second user operation, wherein the second graphic pattern is located at a predetermined position on the last page of the document;
   a locating step of locating the table graphic pattern on each page of the document in accordance with the position and shape set in said setting step, of entering any available record data in each data field of the table graphic pattern, and of storing the document in a memory; and
   a preview display step of displaying a preview of the document,
   wherein said preview display step further displays, when displaying the last page of the document, the second graphic pattern generated in said generation step at the predetermined position and a line indicating a lower limit position of the table graphic pattern on the last page, wherein the line is movable up or down in accordance with a third user operation, and
   wherein the available record data is entered in the table graphic pattern after the lower limit position of the table graphic pattern is set, and if it is determined after filling in the available record data that the filled table graphic pattern and the second graphic pattern overlap one another on the last page in the preview, the table graphic pattern is deformed so as to fit within an area above the line.

8. The storage medium according to claim 7, wherein said preview display step displays the second graphic pattern in a predetermined color which indicates a non editable state.

9. The storage medium according to claim 7, further comprising a sample data entering step of entering sample data in each data field of the table graphic pattern, wherein if the record data is not available, said preview display step displays a preview of the document including the table graphic pattern in which the sample data is entered.

* * * * *